United States Patent
Gelb

(10) Patent No.: US 7,963,376 B2
(45) Date of Patent: Jun. 21, 2011

(54) SYSTEM FOR COOLING A DISC BRAKE ROTOR AND COLLECTING BRAKE PAD WASTE

(76) Inventor: Joseph Gelb, Moreno Valley, CA (US)

( * ) Notice: Subject to any disclaimer, the term of this patent is extended or adjusted under 35 U.S.C. 154(b) by 1099 days.

(21) Appl. No.: 11/736,246

(22) Filed: Apr. 17, 2007

(65) Prior Publication Data

US 2008/0257666 A1 Oct. 23, 2008

(51) Int. Cl.
*F16D 65/847* (2006.01)
(52) U.S. Cl. ............. 188/264 AA; 188/264 R; 188/71.6
(58) Field of Classification Search .............. 188/264 R, 188/264 A, 264 AA, 71.6, 264 P; 74/13, 74/11; *F16D 65/00*
See application file for complete search history.

(56) References Cited

U.S. PATENT DOCUMENTS

| | | | |
|---|---|---|---|
| 1,717,522 A | 6/1929 | Rosenberg | |
| 2,261,463 A | 11/1941 | Garve | |
| 2,299,796 A | 10/1942 | Chase | |
| 2,451,709 A | 10/1948 | Baselt | |
| 2,466,990 A * | 4/1949 | Johnson et al. | 188/366 |
| 2,607,445 A * | 8/1952 | Rausenberger | 188/264 A |
| 2,955,681 A | 10/1960 | Burnett | |
| 3,247,934 A * | 4/1966 | Goode | 188/264 A |
| 3,277,985 A | 10/1966 | Caskey | |
| 3,314,509 A | 4/1967 | Pelikan | |
| 3,444,966 A | 5/1969 | Braukhoff | |
| 3,516,576 A * | 6/1970 | Elliott | 222/622 |
| 3,592,297 A | 7/1971 | Leffert | |
| 3,664,467 A | 5/1972 | Lucien | |
| 3,717,045 A * | 2/1973 | Burenga | 74/15.6 |
| 3,983,974 A | 10/1976 | Dowell | |
| 4,005,768 A | 2/1977 | Bubnash | |
| 4,013,146 A | 3/1977 | Gebhardt | |
| 4,317,508 A | 3/1982 | Katagiri | |
| 4,440,270 A | 4/1984 | Ross | |

(Continued)

FOREIGN PATENT DOCUMENTS

JP 50142977 11/1975

(Continued)

OTHER PUBLICATIONS

International Search Report and Written Opinion in PCT/US2009/061170, dated Jun. 4, 2010.

*Primary Examiner* — Bradley T King
*Assistant Examiner* — Thomas Irvin
(74) *Attorney, Agent, or Firm* — Kirk A. Buhler; Buhler & Associates

(57) ABSTRACT

The present invention is a system which improves the airflow in a disc braking system by using impellers which are powered by a drive shaft that is rotated via a roller that is contacted with the brake rotor. A housing is provided that fits on a brake disc which holds the impellers, drive shaft, and filters. In an alternative embodiment, twin impellers could be used on either side of the rotor to maximize the air flow through the impellers. It is another object of the present invention to provide an impeller shroud housing that has an inlet to allow air to enter the shrouding. There is a mesh filter on the inlet which can capture particles as air is forced into the shrouding. Another filter on the shroud housing outlet to capture the remaining particles as air is forced out of the shroud housing and onto the rotor to aid in cooling of the braking system.

20 Claims, 10 Drawing Sheets

U.S. PATENT DOCUMENTS

| | | |
|---|---|---|
| 4,456,099 A | 6/1984 | Kawaguchi |
| 4,484,667 A | 11/1984 | Bottieri, Jr. |
| 4,503,944 A | 3/1985 | Burckhardt et al. |
| 4,561,522 A * | 12/1985 | Dayen .......................... 188/71.6 |
| 4,589,656 A * | 5/1986 | Baldwin ........................ 482/59 |
| 4,592,452 A * | 6/1986 | Merle .................... 188/264 AA |
| 4,620,616 A | 11/1986 | Martin |
| 4,772,299 A | 9/1988 | Bogusz |
| 4,846,315 A | 7/1989 | Dayen |
| 4,854,750 A * | 8/1989 | Lavin ........................... 384/500 |
| 5,162,053 A | 11/1992 | Kowalski |
| 5,215,168 A * | 6/1993 | Guiot et al. .................. 188/71.6 |
| 5,284,227 A | 2/1994 | Pelfrey |
| 5,772,286 A | 6/1998 | Jordan |
| 5,878,848 A | 3/1999 | Zhang |
| 6,155,650 A | 12/2000 | Barger |
| 6,173,821 B1 | 1/2001 | Herffurth |
| 6,260,669 B1 | 7/2001 | Daudi |
| 6,315,091 B1 | 11/2001 | Nilsen |
| 6,357,563 B1 * | 3/2002 | Hayford et al. ........... 188/264 A |
| 6,371,569 B1 | 4/2002 | Dean |
| 6,419,056 B1 | 7/2002 | Dyko |
| 6,446,766 B1 | 9/2002 | Cornolti |
| 6,536,564 B1 | 3/2003 | Garfinkel |
| 6,578,678 B2 | 6/2003 | Lee |
| 6,592,642 B2 | 7/2003 | Maricq |
| 6,722,476 B1 | 4/2004 | Cornolti |
| 6,796,405 B2 | 9/2004 | Ruiz |
| 6,857,510 B2 | 2/2005 | Schneider |
| 6,880,683 B1 | 4/2005 | Miles |
| 6,932,199 B2 | 8/2005 | Emmett |
| 6,962,242 B2 | 11/2005 | Conti |
| 7,059,456 B2 | 6/2006 | Winkelmann |
| 7,094,268 B2 | 8/2006 | Krantz |
| 7,111,710 B2 | 9/2006 | O'Rourke |
| 7,406,919 B2 * | 8/2008 | Coots ........................ 105/215.2 |
| 2001/0032758 A1 | 10/2001 | Ruiz |
| 2001/0032759 A1 | 10/2001 | Deibel |
| 2002/0017435 A1 | 2/2002 | Feldmann |
| 2002/0023810 A1 | 2/2002 | Hasegawa |
| 2002/0038742 A1 | 4/2002 | Bunker |
| 2002/0084150 A1 | 7/2002 | Lee |
| 2002/0166740 A1 | 11/2002 | Zhang |
| 2003/0006107 A1 | 1/2003 | Tsai |
| 2003/0173166 A1 | 9/2003 | Garfinkel |
| 2003/0221918 A1 | 12/2003 | Lin |
| 2004/0124046 A1 | 7/2004 | Hayes |
| 2004/0216264 A1 * | 11/2004 | Shaver et al. .................... 15/344 |
| 2004/0216968 A1 | 11/2004 | Donadoni |
| 2005/0056495 A1 | 3/2005 | Greppi |
| 2005/0126868 A1 | 6/2005 | Lee |
| 2005/0145452 A1 | 7/2005 | Yamamoto |
| 2005/0183909 A1 | 8/2005 | Rau |
| 2006/0049011 A1 | 3/2006 | Jacob |
| 2006/0086579 A1 | 4/2006 | Gerber |
| 2006/0243547 A1 | 11/2006 | Keller |

FOREIGN PATENT DOCUMENTS

| | | |
|---|---|---|
| JP | 55115635 | 9/1980 |
| JP | 58088237 | 5/1983 |
| JP | 59200821 | 11/1984 |
| JP | 08086325 | 4/1996 |
| JP | 2008196684 | 8/2008 |
| KR | 10200401014757 | 12/2004 |

* cited by examiner

SYSTEM FOR COOLING A DISC BRAKE ROTOR AND COLLECTING BRAKE PAD WASTE

FIELD OF THE INVENTION

The present invention is directed towards a system for collecting the waste discharged from brake pads used in standard disc braking systems. More specifically, the invention discloses a system utilizing impellers, powered by the momentum of the brake rotor, to direct brake pad waste to a collection area.

BACKGROUND OF THE INVENTION

Disc brake systems are the most common form of braking mechanisms used today for vehicle wheels and most specifically for mass produced automobiles. Disc braking systems work by utilizing brake pads which are compressed against a rotor (also called a disc) to slow down a vehicle's wheels. As a by-product of this system, a large amount of heat is released as the kinetic energy from the wheel momentum is converted by the friction created by the brake pads. Additionally, as brake pads erode they release harmful particles into the atmosphere. These harmful particles can also enter and pollute water streams. The present invention addresses and alleviates these common problems.

Cooling is a primary concern for disc braking systems. This is because at high temperatures, the coefficient of friction needed for stopping power is reduced and brake performance is consequently diminished. For this reason, most disc systems include vanes that facilitate airflow and many brake rotors have open bridges that allow for air to flow through the rotor and remove heat from the surface. To that end, many US patents have also been directed towards devices that provide cooling air to reduce the operating temperature of braking systems. These include U.S. Pat. Nos. 4,620,616, 4,503,944, 3,664,467, 4,317, 508, 6,446,766 and 4,440,270. Some US patents have also focused in the use of fans or impellers to aide in air flow. These include U.S. Pat. Nos. 6,880,683, 7,111,710 and 4,013,146.

The waste that is released into the atmosphere from brake pads also creates multiple dilemmas. As force is applied to brake pads, the material on the pads is ground away. This material is known as brake dust and can be problematic for two main reasons. The first is that brake dust is highly corrosive and harmful to the environment. It is estimated that up to ninety percent of the worn away brake pad particles are released into the atmosphere. The dust created, which contains carbon fibers, metal filings and acidic adhesive material, is extremely caustic to the environment. The second problem is that the remainder of the brake dust that is not released into the atmosphere is deposited on the vehicle wheels. The brake dust can be corrosive enough to burn through wheel coatings and leave expensive wheels damaged and unsightly. As a result, there have been a number of devices that have introduced dust shields or filter systems designed to reduce brake dust. These include U.S. Pat. Nos. 7,094,268, 4,484,667, 6,371,569, 6,173,821, 6,932,199, 6,155,650 and 5,772,286. U.S. Pat. No. 5,162,053 discloses a system that utilizes a suction mechanism along with a filter to capture brake dust. Finally, U.S. Pat. No. 6,592,642 discloses a device that utilizes an electrostatic charge to collect charged brake dust particles.

None of the above referenced devices addresses all the problems associated with brake pad waste. Therefore, there is a need for a system that can provide additional cooling air to brake rotors, prevent harmful brake dust from being discharged into the atmosphere, and protect the finish on vehicle wheels from being damaged. Accordingly, the present invention described herein encompasses these and other elements.

BRIEF SUMMARY OF THE INVENTION

It is an object of the present invention is to provide a system which improves the airflow in a disc braking system by using impellers which are powered by a drive shaft that is rotated via a roller and is contacted with the brake rotor.

It is another object of the present invention to provide a housing that fits around a brake disc which holds the impellers, drive shaft, and filters. In an alternative embodiment, twin impellers could be used on either side of the rotor to maximize the air flow through the impellers.

It is another object of the present invention to provide an impeller housing that has an inlet to allow air to enter the shrouding. There is a mesh filter on the inlet which can capture particles as air is forced into the impeller housing.

It is another object of the present invention to provide another filter on the impeller housing outlet to capture the remaining particles as air is forced out of the impeller housing and onto the rotor to aid in cooling of the braking system.

In another exemplary embodiment, the housing can be designed to encompass the brake caliper so that the amount of brake residue captured and the air flow recycled on the brake rotor can be maximized.

It is another object of the present invention to provide pressure release valves near the air intake and outlet on the impeller housing. When either of these valves is activated, it will allow air to bypass the filters in the case they have been clogged. The bypassed air will be redirected to the brake rotor to aid in cooling.

BRIEF DESCRIPTION OF SEVERAL VIEWS OF THE DRAWING

The accompanying drawings, which are incorporated in and constitute a part of the specification, illustrate presently preferred embodiments of the invention, and together with the general description given above and the detailed description given below, serve to explain the principles of the invention.

DETAILED DESCRIPTION OF THE INVENTION

Figure 1:
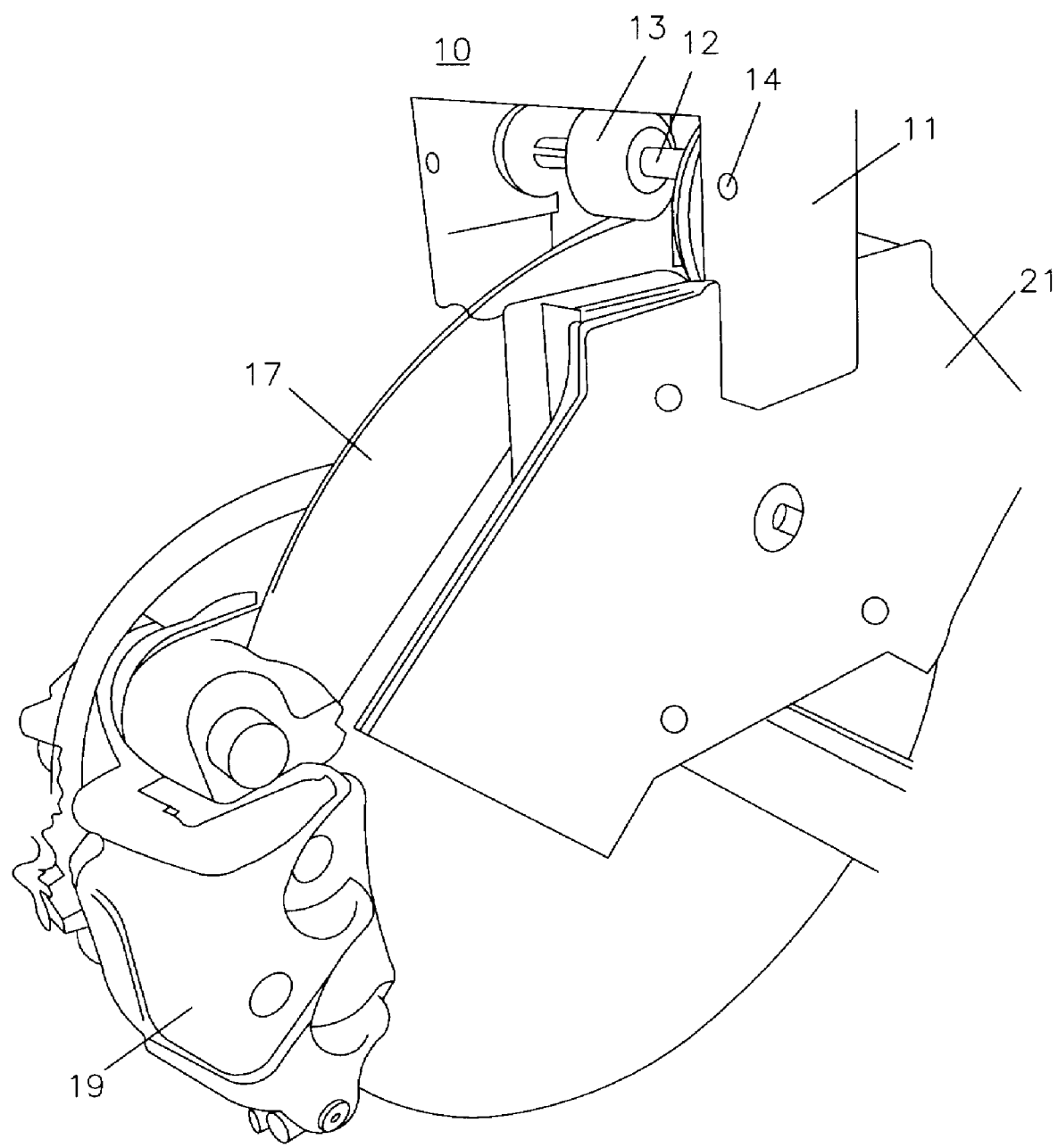
FIG. 1 illustrates perspective view of the current invention.

It will be readily understood that the components of the present invention, as generally described herein, could be arranged and designed in a wide variety of different formulations. Thus, the following more detailed description of the embodiments of the compositions or formulations of the present invention are not intended to limit the scope of the invention, as claimed, but are merely representative of the presently preferred embodiments of the invention.

Reference will now be made in detail to the presently preferred embodiments of the invention, examples of which are illustrated in the accompanying drawings, wherein like reference numerals refer to like elements throughout.

Referring to FIG. 1, the system 10 for increasing the airflow in a disc brake system and collecting brake pad waste is shown. The system 10 is contained in a main housing 11. The housing 11 is attached to a baffle plate 16 that is found in the braking system of many automobiles. In other embodiments, the housing 11 could also be bolted to the brake caliper 19. In yet another exemplary embodiment, the housing could also be designed to encompass the caliper to maximize the amount of airflow from the rotor that can be recycled and amount of brake pad waste captured. The housing 11 is designed to fit over the brake disc or rotor 17. The housing 11 holds the drive shaft 12, drive shaft roller 13, floating bearings 14 and impellers 15. The impellers are held within an impeller housing 21. In the preferred embodiment, the system 10 is designed to have an impeller housing unit on each side of the brake rotor.

Figure 2:
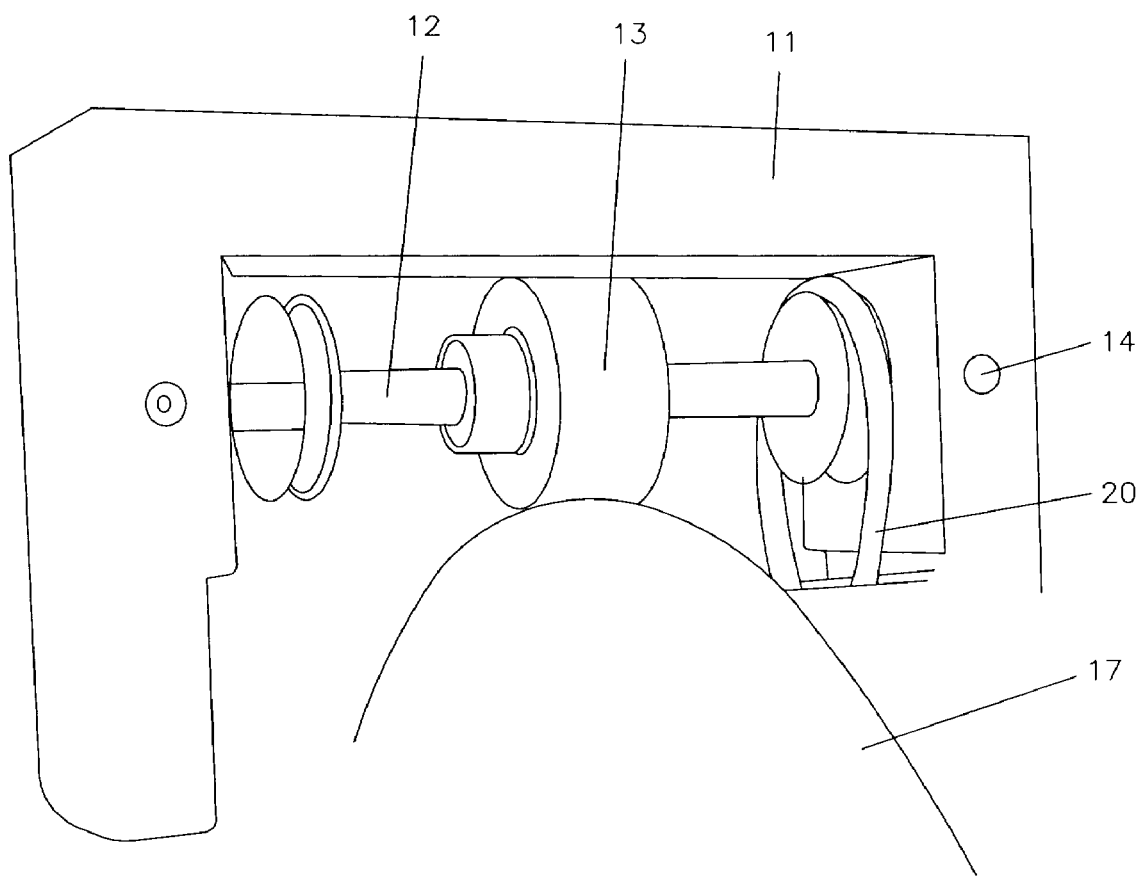
FIG. 2 illustrates an exploded view of the drive shaft of the current invention.
Figure 4:
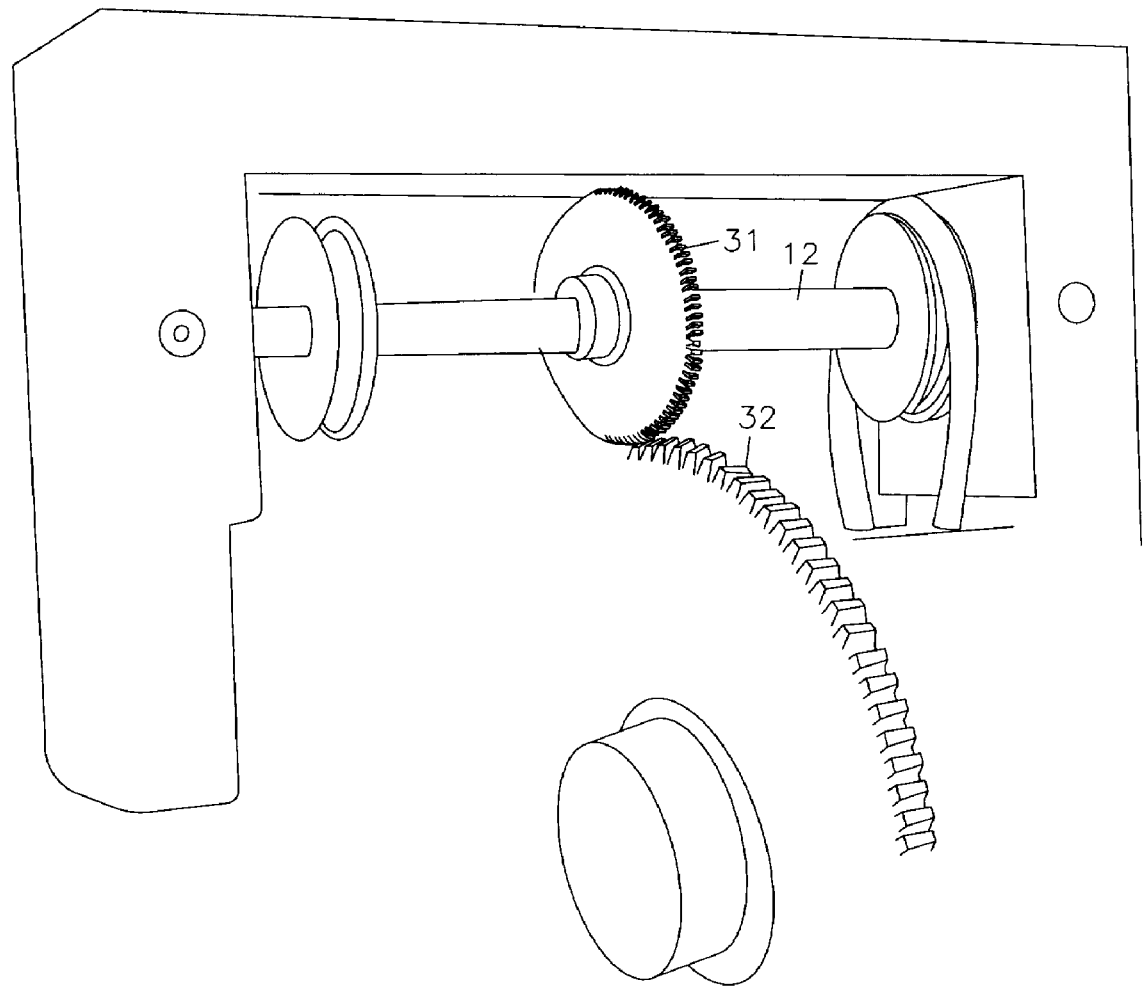
FIG. 4 illustrates an exploded view of the drive shaft in an alternative embodiment of the invention.

Referring now to FIG. 2, an exploded view of the drive shaft 12 is shown. The drive shaft 12 is held in the housing 11 and is attached to the housing 11 using floating bearings 14. The floating bearing unit, which will be described in greater detail blow, allows the drive shaft 12 to be properly positioned under different heat conditions or after wear in the braking system. In the preferred embodiment, the drive shaft 12 utilizes a roller 13 to contact the rotor 17. When a vehicle wheel turns, the rotor 17 will be rotated in the same direction the wheel rotates and in turn will contact the roller 13. The roller 13 will then turn the drive shaft 12 in the opposite direction of the rotor 17. As will be described later, the drive shaft 12 will be used to power the impellers 15 to draw air from the rotor 17. The roller 13 can be constructed from a high temperature Silicon compound or any material that withstand the heat and wear caused by the contact with the rotor 17. It is appreciated that in other embodiments, various methods can be used so that the rotor 17 can power the drive shaft 12. As best seen in FIG. 4, one such alternative embodiment is shown. In this embodiment, there is a direct drive design wherein the rotor 17 and drive shaft 12 are fashioned with gears 31, 32 that contact as the rotor 17 is turned. The direct drive configuration would eliminate the need for a roller attachment.

Figure 3A:
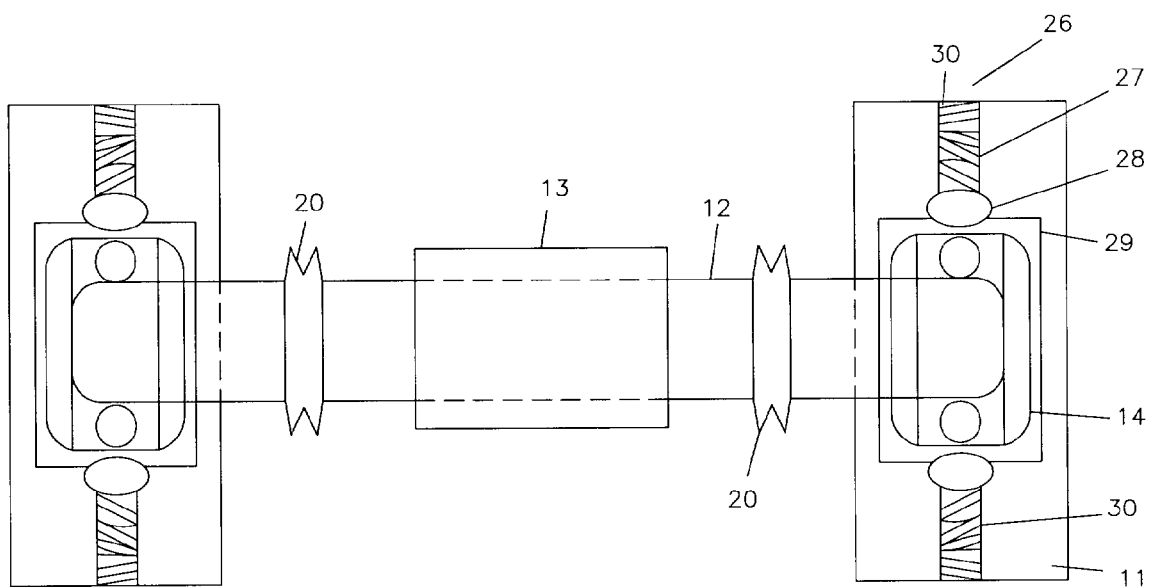
FIG. 3a illustrates a perspective view of the floating bearing unit.
Figure 3B:
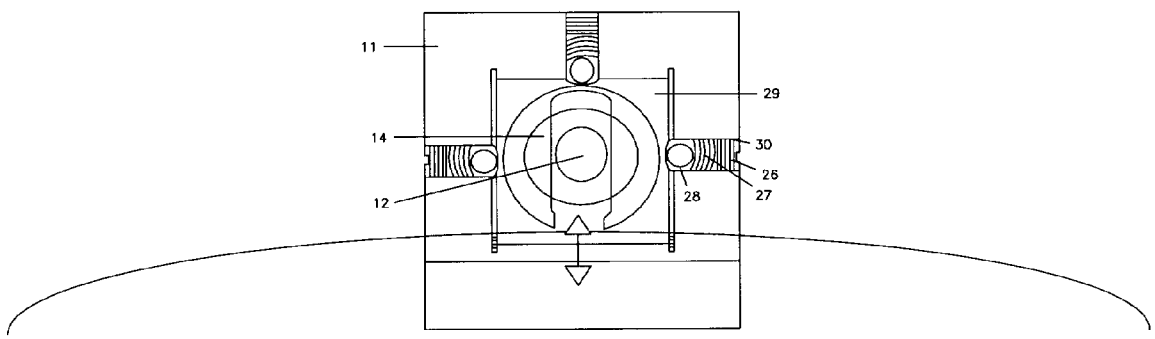
FIG. 3b illustrates a cross-sectional view of the floating bearing unit.

Referring now to FIGS. 3a and 3b, the floating bearing system for the drive shaft will be described in greater detail. The ends of the drive shaft 12 and bearings 14 are contained in block 29 which rests in the unit housing 11. As best seen in FIG. 3b, there are machined out channels 30 above and on the sides of the block 29. Inside the channels are ball bearings 28 and springs 27. Set screws 26 are used to contain the unit and place pressure against the springs 27. With the springs 27 holding the block 29 in place, it has the ability to "float" or move along the vertical and horizontal planes. This will allow the system 10 to function effectively under increased heat conditions and even as the break system wears.

In the preferred embodiment, the drive shaft 12 utilizes a spring belt 20 to contact and turn the impellers 15. It is also appreciated that other methods could be used to transfer power from the drive shaft 12 to the impellers 15. These include a direct drive design wherein in the drive shaft 12 and impellers 15 are fitted with gears that contact as the drive shaft 12 is turned. In addition, a V-belt or chain drive could be utilized to turn the impellers 15. Finally, the gear ratio between the impeller and drive shaft can be adjusted to determine the cubic feet per minute (CFM) of air drawn by the impellers.

Figure 5:
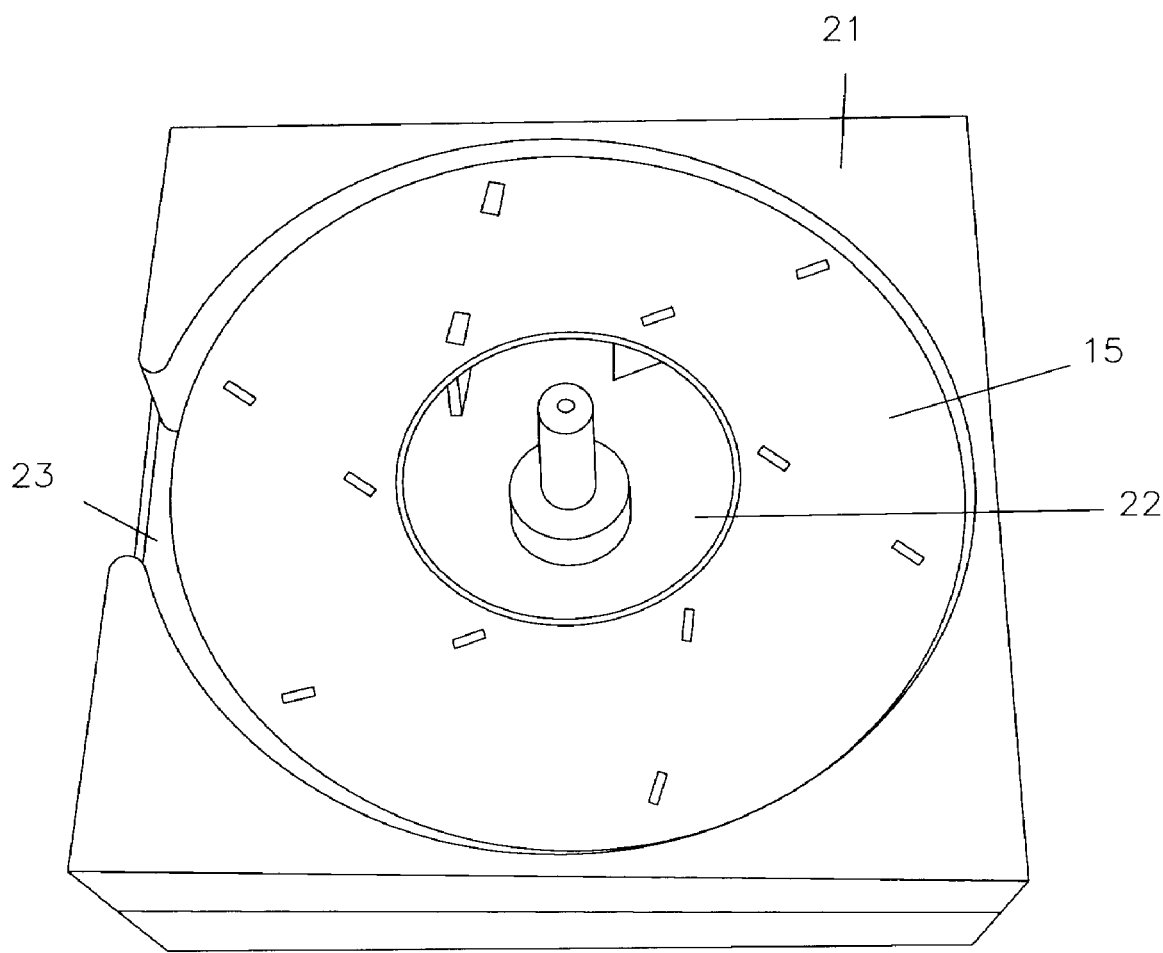
FIG. 5 illustrates and exploded view of an impeller housing.
Figure 6A:
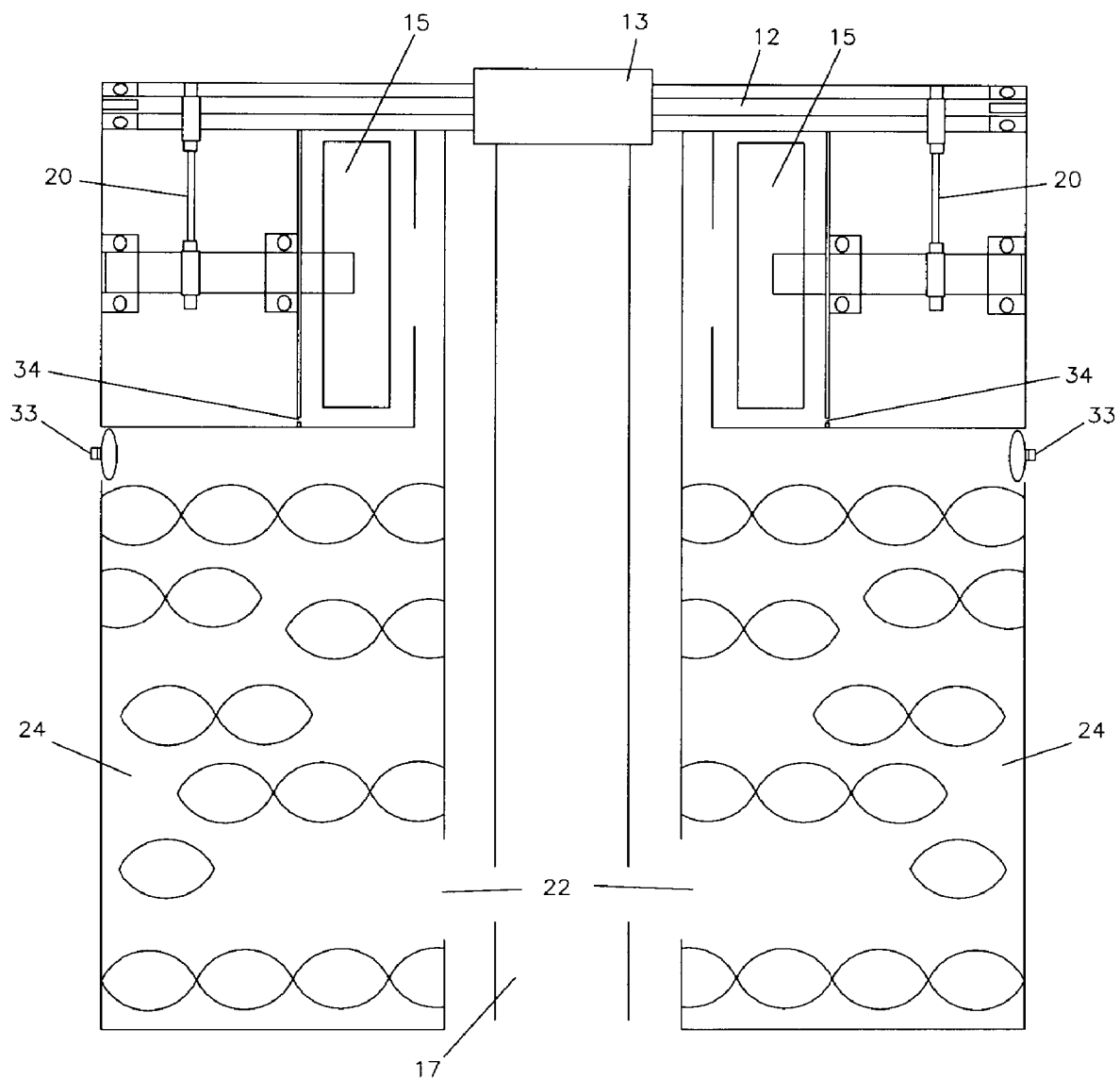
FIG. 6a illustrates a perspective view of the current invention showing the inlet filters.
Figure 6B:
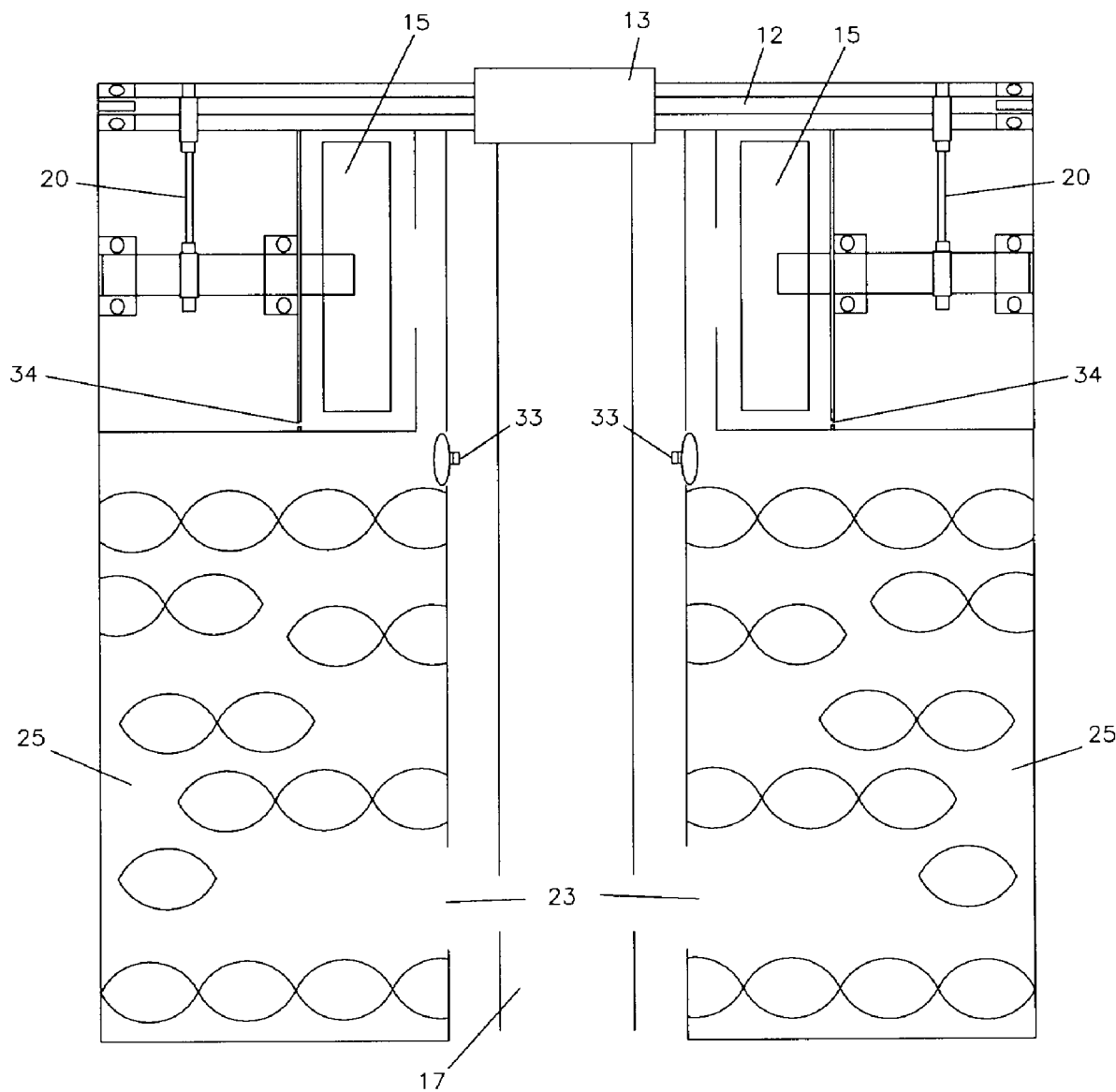
FIG. 6b illustrates a perspective view of the current invention showing the outlet filters.

Referring now to FIGS. 5, 6a and 6b, a cross sectional view of the impeller housing 21 and prospective views showing the filters 24, 25 are shown. FIG. 6a shows a view showing the inlet filter 24. As seen in FIG. 6b, the identical configuration is used on the other side of the impellers 15 for the outlet filter 25. The impeller housing 21 covers the impellers 15 and has an air inlet 22 and air outlet 23. When the impellers 15 are turned air will be drawn from the brake rotor 17 into the air inlet 22 of the impeller housing 21. The air will then pass through the inlet filter 24, the outlet filter 25, and finally out the air outlet 23 before being directed back onto the brake rotor 17. The impeller housing 21 is also designed to have a pressure release valve 33 on both the air inlet 22 and air outlet 23. If the inlet filter 24 is clogged, the pressure release valve 33 on the air inlet will be opened to allow air to enter the impeller housing. Likewise, if the air outlet filter is clogged, the pressure release valve 33 on the air outlet 23 will be opened to allow air to leave the impeller housing. The impeller housing 21 will also be fitted with a small hole 34 so that a small amount of brake dust can be directed onto the drive shaft 12. This minimal amount of brake dust will be used to lubricate the drive shaft 12 to maximize its efficiency. Additionally, the impeller housing 21 can be insulated to reduce the noise from the system.

In the preferred embodiment, the air inlet and air outlet filters 24,25 will be standard reusable steal or copper mesh filters with a micron filter of approximately 80 microns. It is, however, appreciated that any filter type capable of capturing the particles released from brake pads can be used in the system. Another environmental benefit of the system is that once the filters are cleaned the brake dust can be recycled.

In the preferred embodiment, one impeller 15 will be positioned on either side of the brake rotor 17. In other exemplary embodiments various configurations can be used to adjust the amount of air drawn from the rotor 17. One such configuration is a twin impeller design. In that configuration two impellers would be used in parallel in each impeller housing 21. By using more than one impeller, the amount of airflow redirected to the brake rotor 17 will be increased. Additionally, impellers with curved paddles can be used to reduce the noise from the system.

Figure 7:
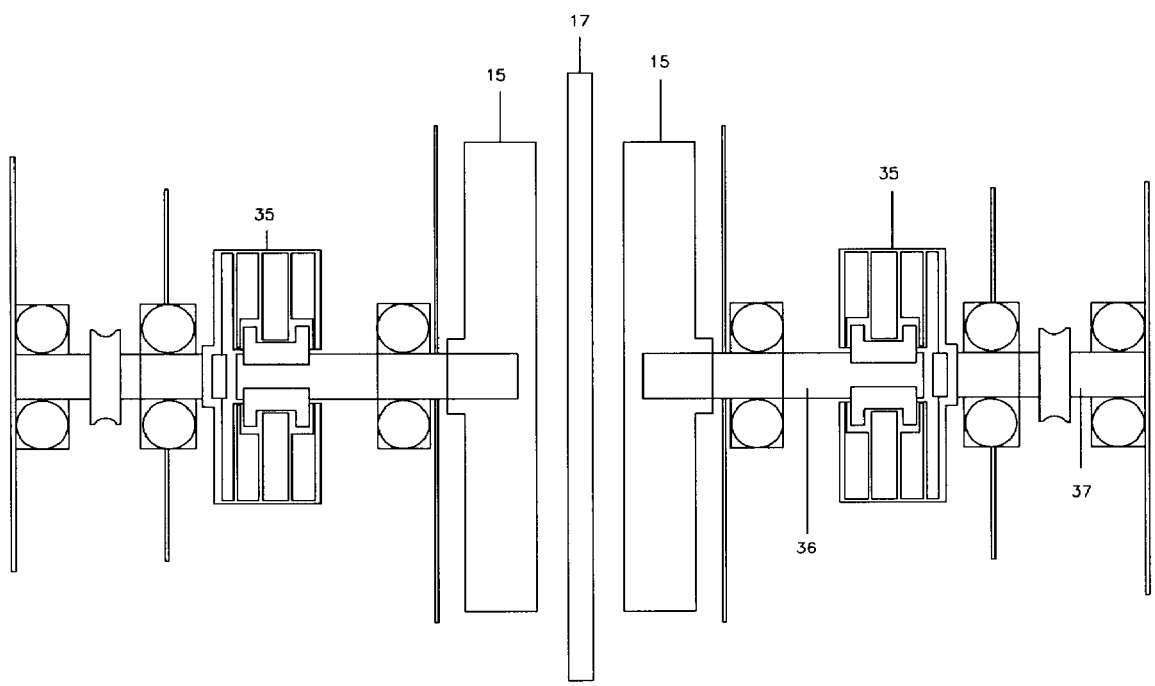
FIG. 7 illustrates and exploded view of the current invention showing the impeller assembly with the reverse centrifugal clutch configuration.

FIG. 7 shows another embodiment wherein the impeller assembly is also fitted with a reverse centrifugal clutch assembly 35. The centrifugal clutch 35 links the impeller shaft 36 with the power drive from the spring belt 20. The purpose of the reverse clutch 35 is to disengage when the impeller creates an output beyond a set maximum RPM (rotations per minute) and air flow (CFM). This will prevent any damage to the assembly which may occur at extreme operating conditions. The clutch 35 consists of an outer drum attached directly to the spring belt 37. The drum holds a pair of cylindrical clutch weights attached to a drum with a pair of springs enclosed in a guide. The springs keep constant pressure on the clutch weights that come in contact with the impeller shaft 36. With the clutch 35 engaged, both the impeller shaft 36 and spring belt shaft 37 work as one. Only at a high RPM rates will the clutch 35 disengage and allow the impeller shaft 36 to slow or stop. When the RPMs are reduced there is less centrifugal force so that the springs push the clutch weights back up against the impeller shaft 36. This will engage the two shafts 36,37 again so that the system 10 can function as previously described.

Figure 8:
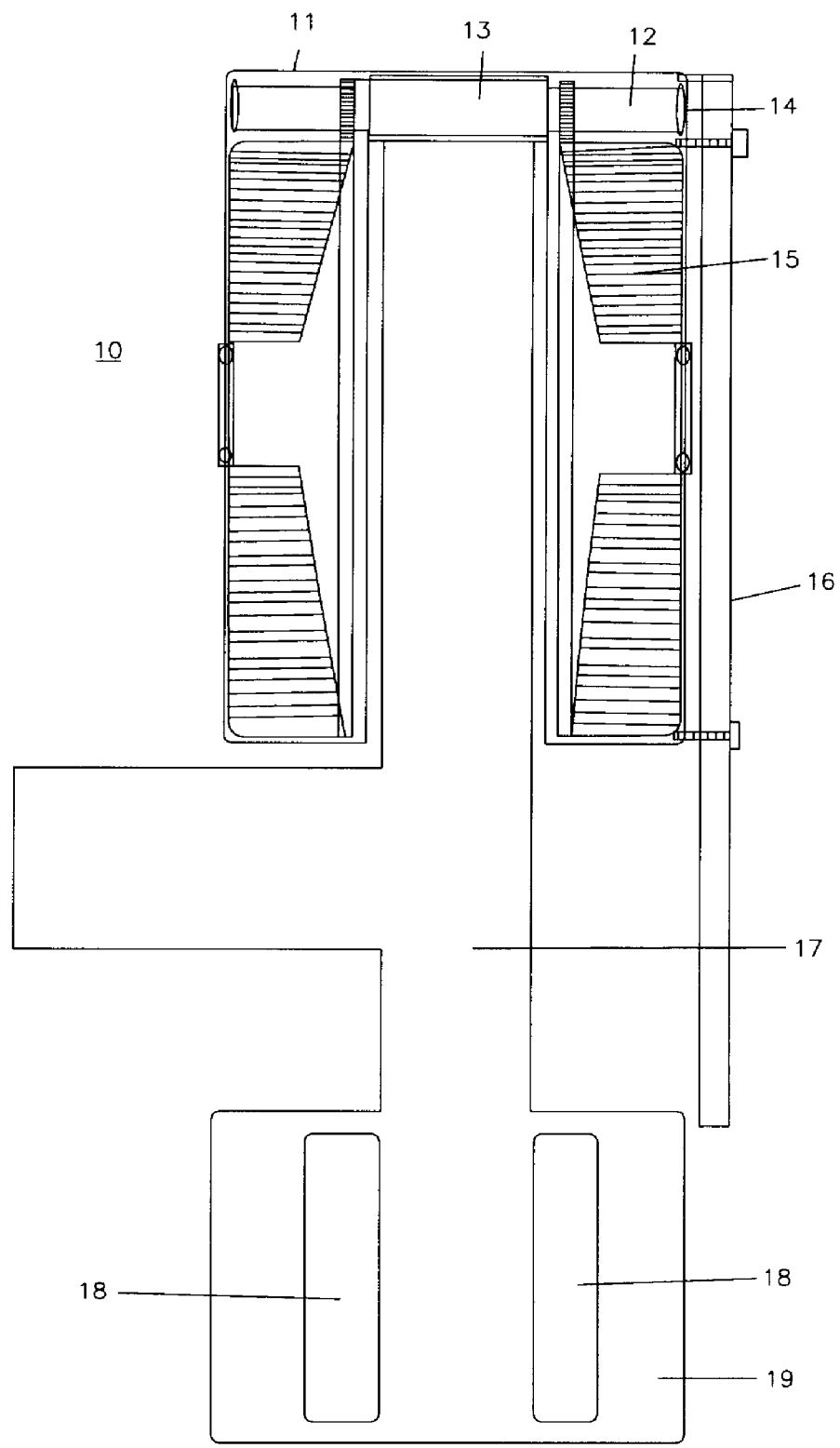
FIG. 8 illustrates a perspective view of the current invention attached to a disc brake assembly.

Referring now to FIG. 8, the system for introducing increased airflow in a brake system and collecting brake pad waste will be described. In order to stop the motion of vehicle wheels, disc brake systems are used. Wheels are connected to a brake rotor 17 that turns with the wheels. To slow the movement of the rotor 17 and in turn the wheels, a brake caliper 19 is used. The caliper 19 is fitted with brake pads 18 which are positioned on either side of the brake rotor 17. The caliper is used to press the brake pads 18 against the rotor. The kinetic energy of the rotor 17 is then converted to heat by the friction between the rotor 17 and the brake pads 18. As the brake pads 18 wear, particles are released from the pads. This "brake dust" comprises the waste that is collected by the filters 24, 25.

As the rotor 17 is turned, the drive shaft 12 is engaged and is powered by the rotation of the rotor 17. The drive shaft 12 in turn powers the impellers 15. The rotation of the impellers 15 creates a suction that draws the air and brake dust from the rotor into the impeller housing 21. Once in the impeller housing 21, the airflow is moved through both the inlet 24 and outlet 25 filters. These filters capture the brake dust so that is not released into the atmosphere or deposited on the vehicle wheels. The airflow is then directed out of the impeller housing 21 and back onto the brake rotor 17. This increased airflow onto the rotor 17 will act to cool the braking system and increase the overall brake efficiency of the vehicle brakes.

It is to be appreciated that additional advantages, modifications and equivalent embodiments will be apparent to those skilled in the art. Therefore, the invention, in its broader aspects, is not limited to the specific details and representative devices, shown and described herein. Accordingly, various modifications may be made without departing from the spirit or scope of this invention as defined by the appended claims and their equivalents.

What I claim is:

1. A system for increasing the air flow to a disc brake assembly and collecting the waste from disc brake pads, said system comprising:
    a main housing;
    a drive shaft, said drive shaft powered by a rotor from a disc brake assembly wherein said disc brake assembly generates brake dust waste;
    at least one impeller, said impeller positioned to be powered by said drive shaft, said impeller is capable of being turned to draw airflow from said rotor of said disc brake assembly;
    at least one impeller housing, said impeller housing holding said at least one impeller and having an airflow inlet and an airflow outlet, said airflow outlet is positioned so that airflow from said airflow outlet is directed back onto said rotor of said disc brake assembly;
    an inlet filter located on said airflow inlet to collect said brake dust waste; and
    an outlet filter located on said airflow outlet.

2. The system for increasing the air flow to a disc brake assembly and collecting the waste disc brake pads of claim 1 wherein at least one said impeller is positioned on either side of rotor from a disc brake assembly.

3. The system for increasing the air flow to a disc brake assembly and collecting the waste from disc brake pads of claim 1 wherein said drive shaft further comprises a roller, said roller designed to contact a rotor from a disc brake assembly, said roller capable of being rotated to power said drive shaft.

4. The system for increasing the air flow to a disc brake assembly and collecting the waste from disc brake pads of claim 1 wherein said drive shaft is connected to said main housing using a floating bearing unit, said floating bearing unit comprising:
    a machined block, said block capable of accepting the drive shaft and a bearing;
    ball bearings which are positioned on the top and sides of said machined block; and
    spring loaded set screws which are positioned against said ball bearings;
    said spring loaded set screws allowing the machined block to move along the vertical and horizontal planes to apply essentially only normal force on said rotor of said disc brake assembly.

5. The system for increasing the air flow to a disc brake assembly and collecting the waste from disc brake pads of claim 1 wherein said impeller is connected to said drive shaft by a spring belt, said spring belt powering said impeller when said drive shaft is rotated by said rotor of said disc brake assembly.

6. The system for increasing the air flow to a disc brake assembly and collecting the waste from disc brake pads of claim 1 wherein said housing can be attached to a baffal plate of a disc brake assembly.

7. The system for increasing the air flow to a disc brake assembly and collecting the waste from disc brake pads of claim 1 wherein said housing can be attached to a caliper of a disc brake assembly.

8. The system for increasing the air flow to a disc brake assembly and collecting the waste from disc brake pads of claim 1 wherein said housing can be designed to cover a caliper of a disc brake assembly.

9. The system for increasing the air flow to a disc brake assembly and collecting the waste from disc brake pads of claim 1 wherein said impeller housing further comprises at least one pressure release valve, said pressure release valve designed to open if said inlet filter or said outlet filter are clogged, said pressure release valve allowing air to enter or exit said impeller housing, said pressure release valve positioned to direct air to cool a rotor of disc brake assembly.

10. The system for increasing the air flow to a disc brake assembly and collecting the waste from disc brake pads of claim 1 wherein said impeller housing further comprises a duct that directs airflow from said air inlet to said drive shaft to lubricate said drive shaft.

11. The system for increasing the air flow to a disc brake assembly and collecting the waste from disc brake pads of claim 1 wherein there are at least two impellers held in separate said at least one impeller housings in said main housing, said at least two impellers being used in series, wherein a first impeller drawing airflow from said rotor of said disc brake assembly into said air inlet of said impeller housing and increasing a velocity of airflow before directing said airflow to a second impeller, this process continuing to a last impeller in a series to maximize said airflow directed out of said impeller housing.

12. The system for increasing the air flow to a disc brake assembly and collecting the waste from disc brake pads to claim 1 wherein said inlet filter and said outlet filter are mesh air filters.

13. The system for increasing the air flow to a disc brake assembly and collecting the waste from disc brake pads of claim 1 wherein said impeller is made from aluminum or steel.

14. The system for increasing the air flow to a disc brake assembly and collecting the waste from disc brake pads of claim 1 wherein said outlet filter collects said brake dust waste.

15. The system for increasing the air flow to a disc brake assembly and collecting the waste from disc brake pads of claim 1 wherein said drawn airflow moves and collects said brake dust waste into said inlet filter.

16. The system for increasing the air flow to a disc brake assembly and collecting the waste from disc brake pads of claim 1 wherein said drawn airflow moves and collects said brake dust waste into said outlet filter.

17. The system for increasing the air flow to a disc brake assembly and collecting the waste from disc brake pads of claim 1 wherein said inlet and said outlet filters are replaceable, changeable or cleanable.

18. A system for increasing the air flow to a disc brake assembly and collecting the waste from disc brake pads, said system comprising:
 a main housing;
 a drive shaft, said drive shaft powered by a rotor from a disc brake assembly wherein said disc brake assembly generates brake dust waste;
 at least one impeller, said impeller positioned to be powered by said drive shaft, said impeller is capable of being turned to draw airflow from said rotor of said disc brake assembly;
 at least one impeller housing, said impeller housing holding said at least one impeller and having an airflow inlet and an airflow outlet, said airflow outlet is positioned so that airflow from said airflow outlet is directed to cool said rotor of said disc brake assembly, and
 a filtering mechanism to collect said brake dust waste from said airflow.

19. The system of claim 18 further comprising an inlet filter located on said airflow inlet.

20. The system of claim 18 further comprising an outlet filter located on said airflow outlet.

\* \* \* \* \*